(12) United States Patent
Su et al.

(10) Patent No.: US 7,012,510 B2
(45) Date of Patent: Mar. 14, 2006

(54) DEVICE AND METHOD FOR ADJUSTING VIEW RANGE OF VEHICULAR MONITORING DEVICE

(75) Inventors: Wen-Wei Su, Hsinchu (TW); Kuei-Hung Chen, Taipei (TW); Shun-Hsiang Hsiao, Miaoli (TW)

(73) Assignee: Exon Science Inc., Taoyuan (TW)

( * ) Notice: Subject to any disclaimer, the term of this patent is extended or adjusted under 35 U.S.C. 154(b) by 94 days.

(21) Appl. No.: 10/372,619

(22) Filed: Feb. 21, 2003

(65) Prior Publication Data

US 2003/0151835 A1 Aug. 14, 2003

Related U.S. Application Data

(63) Continuation-in-part of application No. 10/047,762, filed on Jan. 15, 2002, now Pat. No. 6,756,888, which is a continuation-in-part of application No. 09/946,094, filed on Sep. 4, 2001, now Pat. No. 6,672,728.

(30) Foreign Application Priority Data

Feb. 25, 2002 (CN) .......................... 2105275 A (51) Int. Cl.
*B60Q 1/00* (2006.01)

(52) U.S. Cl. .................. 340/436; 340/435; 701/301
(58) Field of Classification Search ............... 701/301; 340/436, 435, 903
See application file for complete search history.

(56) References Cited

U.S. PATENT DOCUMENTS

| 4,318,590 A | 3/1982 | Hanley | ...................... 359/843 |
| 4,679,158 A | 7/1987 | Tate | ........................... 700/302 |

(Continued)

FOREIGN PATENT DOCUMENTS

| DE | 38 05 125 A1 | 8/1989 |
| DE | 41 15 474 A1 | 11/1992 |

(Continued)

OTHER PUBLICATIONS

A Low Cost Practical GPS Integrated Navigation System Oct. 2000 Journal of Institute of Command and Technology vol. 11 No. 5 (Translation of Abstract).

*Primary Examiner*—Toan N. Pham
(74) *Attorney, Agent, or Firm*—Volpe and Koenig, P.C.

(57) ABSTRACT

A device for adjusting a view range of a vehicular monitoring device includes a vehicle status detector mounted on a turning portion of a vehicle for detecting a turning degree of the turning portion, and outputting an adjusting signal associated with the turning degree; and a controller in communication with the vehicle status detector and the vehicular monitoring device, controlling the vehicular monitoring device to move from an initial position to a working position in response to the adjusting signal. The working position varies with the turning degree.

34 Claims, 5 Drawing Sheets

U.S. PATENT DOCUMENTS

| | | | |
|---|---|---|---|
| 4,746,206 A | 5/1988 | Kusztos et al. ............. 359/555 |
| 4,953,305 A | 9/1990 | Van Lente et al. ............. 33/356 |
| 5,027,200 A | 6/1991 | Petrossian et al. ........... 348/118 |
| 5,132,851 A | 7/1992 | Bomar et al. ................ 359/843 |
| 5,249,083 A | 9/1993 | Doughtie et al. ........... 359/843 |
| 5,306,953 A | 4/1994 | Weiner ...................... 359/849 |
| 5,680,123 A | 10/1997 | Lee ........................... 340/937 |
| 5,708,857 A | 1/1998 | Ishibashi ..................... 396/21 |
| 5,719,713 A | 2/1998 | Brown ...................... 359/843 |
| 5,835,291 A | 11/1998 | Takayama ................... 359/843 |
| 5,899,956 A | 5/1999 | Chan ..................... 250/231.17 |
| 5,953,168 A | 9/1999 | Valentino .................... 359/843 |
| 5,990,649 A * | 11/1999 | Nagao et al. ............ 318/568.1 |
| 6,166,698 A | 12/2000 | Turnbull et al. ............. 343/700 |
| 6,175,300 B1 | 1/2001 | Kendrick .................... 340/436 |
| 6,193,380 B1 | 2/2001 | Jacobs ....................... 359/843 |
| 6,217,177 B1 | 4/2001 | Toner et al. ................. 435/374 |
| 6,229,434 B1 | 5/2001 | Knapp et al. ........... 340/310.01 |
| 6,314,352 B1 | 11/2001 | Kunimatsu et al. ........... 701/36 |
| 6,314,364 B1 | 11/2001 | Nakamura .................. 701/200 |
| 6,348,858 B1 | 2/2002 | Weis et al. .................. 340/430 |
| 6,380,536 B1 | 4/2002 | Inoue et al. ................... 701/41 |
| 6,406,154 B1 | 6/2002 | Chen ......................... 359/843 |
| 6,421,081 B1 | 7/2002 | Markus ...................... 348/149 |
| 6,593,960 B1 | 7/2003 | Sugimoto et al. ........... 348/148 |
| 2002/0057016 A1 | 5/2002 | O'Farrell et al. ........... 359/843 |
| 2003/0043479 A1 | 3/2003 | Su et al. ..................... 359/843 |

FOREIGN PATENT DOCUMENTS

| | | |
|---|---|---|
| DE | 299 13 557 U1 | 8/1999 |
| DE | 1001622 | 3/2000 |
| DE | 10020985 | 4/2000 |
| DE | 100 20 985 A1 | 9/2000 |
| EP | 0 962 360 A2 | 8/1999 |
| EP | 1 065 642 A2 | 1/2001 |
| EP | 1 114 750 A2 | 7/2001 |
| EP | 1 170 172 A2 | 1/2002 |
| JP | 60-199748 | 10/1985 |
| JP | 08-207665 | 8/1996 |
| JP | 09-175273 | 7/1997 |
| JP | 10-138838 | 5/1998 |
| JP | 2000-118301 | 4/2000 |
| JP | 2201294086 | 4/2000 |
| JP | 2001108685 | 10/2000 |
| JP | 2001294086 | 10/2001 |
| JP | 2001347907 | 12/2001 |
| KR | 2001 108685 | 10/2000 |
| TW | 57050 | 9/1972 |
| TW | 388377 | 11/1986 |
| TW | 448875 | 10/1988 |
| TW | 448874 | 11/1988 |
| TW | 465498 | 1/1989 |
| TW | 467051 | 3/1989 |
| TW | 459673 | 11/1989 |

* cited by examiner

DEVICE AND METHOD FOR ADJUSTING VIEW RANGE OF VEHICULAR MONITORING DEVICE

CROSS REFERENCE TO RELATED PATENT APPLICATION

This patent application is a continuation-in-part (CIP) of a U.S. patent application Ser. No. 10/047,762 filed Jan. 15, 2002 now U.S. Pat. No. 6,756,888, which is a continuation-in-part (CIP) of another U.S. patent application Ser. No. 09/946,094 filed Sep. 4, 2001 now U.S. Pat. No. 6,672,728, now both pending. The contents of the related patent applications are incorporated herein for reference.

FIELD OF THE INVENTION

The present invention relates to a view-range adjusting device, and more particular to a device for adjusting the view range of a vehicular monitoring device. The present invention also relates to a method for adjusting a vehicular monitoring device.

BACKGROUND OF THE INVENTION

When a driver is seated in a vehicle, he should adjust all of the interior and exterior rearview mirrors according to his need. The rearview mirror can be adjusted manually or automatically by pushing buttons. After the adjustment of rearview mirrors is done, the view angle of each rearview mirror seen by the driver is constant, and it is difficult and also dangerous for the driver to further change the view angles while driving.

In practice, when a driver would like to change to another lane, turn to another direction or overtaking a car, he will need to realize more about the situation of the adjacent lane to see whether there is any vehicle oncoming. Therefore, the horizontally turning of the rearview mirror toward the target lane will be helpful for the lane-changing or overtaking operation. In addition, while moving up or down a slope, it is advantageous to turn the rearview mirror vertically to obtain a view range similar to that on the flat road.

Taiwanese Patent Publication Nos. 388377, 465498, 448874 and 448875 issued to Sun (Taipei, Taiwan, R.O.C) and 459637 to Hsieh (Hsinchu, Taiwan, R.O.C), which are incorporated herein for reference, disclose the automatic movement of rearview mirrors according to the driving situations of a vehicle so that the driver can have an improved view angle without manually adjusting the rearview mirrors while driving. These techniques, although create a flexible view range for the vehicle, does not solve the problem thoroughly.

For example, when the driver is changing his vehicle to the immediately adjacent lane, a small degree of rotating angle of the rearview mirror is enough to realize the situation of the adjacent lane. On the contrary, when the vehicle has to run across more lanes continuously, the driver may need to realize more about the further adjacent lane. For another example, when the slopes that the vehicle is climbing up are different, the required rotating angles of the rearview mirror are supposed to be different in order to obtain a view range similar to that on the flat road. Therefore, it is preferred that the view range of the rearview mirror can be optionally adjusted with the change of the vehicular traveling status. The prior art, however, move the rearview mirror only between two fixed positions, i.e. the initial position and the working position, and thus are not flexible enough. Moreover, the time required for returning to the initial position for the normal driving mode would be relatively long if the preset rotating angle from the initial position to the working position is relatively large.

Further, some of the prior art do not disclose the returning timing of the rearview mirror back to the initial position, which is definitely necessary after recovering to the normal driving mode, and the other just disclose that the rearview mirror returns to the initial position when the rotation-enabling device, e.g. the indicator light, for enabling the rearview mirror to rotate is disabled. This is also inflexible in practice.

SUMMARY OF THE INVENTION

Therefore, an object of the present invention is to provide a device and a method for adjusting the view range of the rearview mirror according to the traveling status of the vehicle so as to provide optional view ranges.

Another object of the present invention is to provide a device and a method for adjusting the view range of the rearview mirror, which have the rearview mirror automatically return to the initial position for various cases.

A first aspect of the present invention relates to a device for adjusting a view range of a vehicular monitoring device. The device comprises a vehicle status detector mounted on a turning portion of a vehicle for detecting a turning degree of the turning portion, and outputting an adjusting signal associated with the turning degree; and a controller in communication with the vehicle status detector and the vehicular monitoring device, controlling the vehicular monitoring device to move from an initial position to a working position in response to the adjusting signal. The working position varies with the turning degree.

The turning portion, for example, can be a steering wheel of the vehicle or a driving tire of the vehicle.

Preferably, the working position continuously varies with the turning degree.

Alternatively, the working position varies with the turning degree in stages.

The vehicular monitoring device, for example, can be a rearview mirror, a camera and/or a display.

Preferably, a movement speed of the vehicular monitoring device between the initial position and the working position depends on a velocity of the vehicle.

Preferably, the device further comprises a vehicular digital bus for communicating the vehicle status detector with the controller. For example, the vehicular digital bus is a controller area network (CAN) bus or a vehicle area network (VAN) bus.

A second aspect of the present invention relates to a device for adjusting a view range of a vehicular monitoring device, comprising a vehicle dynamics control system detecting a plurality of traveling parameters of a vehicle; and a controller in communication with the vehicle dynamics control system and the vehicular monitoring device, controlling the vehicular monitoring device to move from an initial position to a working position in response to a turning information included in the plurality of traveling parameters. The working position varies with the turning information.

The vehicle dynamics control system, for example, can be a vehicle stability control (VSC) system or an electronic stability program (ESP).

A third aspect of the present invention relates to a device for adjusting a view range of a vehicular monitoring device, comprising a slope detector for detecting a tilting degree of a vehicle, and outputting an adjusting signal associated with the slope information; and a controller in communication with the slope detector and the vehicular monitoring device, controlling the vehicular monitoring device to move from an initial position to a working position in response to the adjusting signal. The working position varies with the tilting degree.

The slope detector, for example, can be an attitude indicator, an accelerating indicator or a mercury switch.

A fourth aspect of the present invention relates to a device for adjusting a view range of a vehicular monitoring device, comprising: a backing-up sensor for determining whether a backing-up operation is to be performed; a turning detector for detecting a turning degree of a vehicle; and a controller in communication with the backing-up sensor, the turning detector and the vehicular monitoring device, controlling the vehicular monitoring device to move from an initial position to a working position according to the turning degree when the backing-up operation is determined. The working position varies with the turning degree.

The backing-up sensor, for example, detects the entering of a reverse gear or the enabling of a back-warning radar.

The turning detector, for example, can be an electronic compass, a steering-wheel turning detector, a tire-angle switch, a vehicle stability control (VSC) system, an electronic stability program (ESP) or a yaw sensor.

A fifth aspect of the present invention relates to a device for adjusting a view range of a vehicular monitoring device, comprising: a backing-up detector for determining whether a backing-up operation is to be performed, and detecting a clearance of a vehicle from a rear object when the backing-up operation is determined; and a controller in communication with the backing-up detector and the vehicular monitoring device, controlling the vehicular monitoring device to move from an initial position to a working position according to the clearance. The working position varies with the clearance.

The backing-up detector, for example, can be a back-warning radar, a digital camera or a radio wave distance meter.

A sixth aspect of the present invention relates to a method for adjusting a view range of a vehicular monitoring device. The method comprises steps of receiving an output of a vehicular status detector; triggering the vehicular monitoring device to move between an initial position and a working position according to the output of the vehicular status indicator; and forcibly moving the vehicular monitoring device back to the initial position when an emergency state is determined.

The vehicular status detector, for example, can be an electronic compass, a global positioning system (GPS), a steering-wheel turning detector, a tire-angle switch, a vehicle stability control (VSC) system, an electronic stability program (ESP), a yaw sensor, an attitude indicator, an accelerating indicator, a mercury switch, a reverse gear sensor or a back-warning radar.

Preferably, the working position continuously varies with the output of the vehicular monitoring device. Alternatively, the working position varies with the vehicular monitoring device in stages.

The emergency state is determined, for example, when emergency brake is done, when the anti-lock brake system (ABS) is enabled, or when the traction control system is enabled

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

In order to allow the rearview mirror to be automatically and dynamically adjusted while driving, a vehicle status detector is mounted onto the vehicle to detect the travel status of the vehicle. Please refer to FIG. 1 that illustrates a device for dynamically adjusting the view range of the vehicular monitoring device, e.g. a rearview mirror, according to a first embodiment of the present invention. The vehicle status detector 10 is mounted on a turning portion 11 of the vehicle, e.g. the steering wheel or a driving tire. When the turning portion 11 changes its angle due to the operation of the driver, the vehicle status detector 10 detects the turning degree of the turning portion 11, and outputs an adjusting signal associated with the turning degree to the controller 12. The controller 12 then controls the movement of the rearview mirror 13 in response to the adjusting signal.

Figure 1:
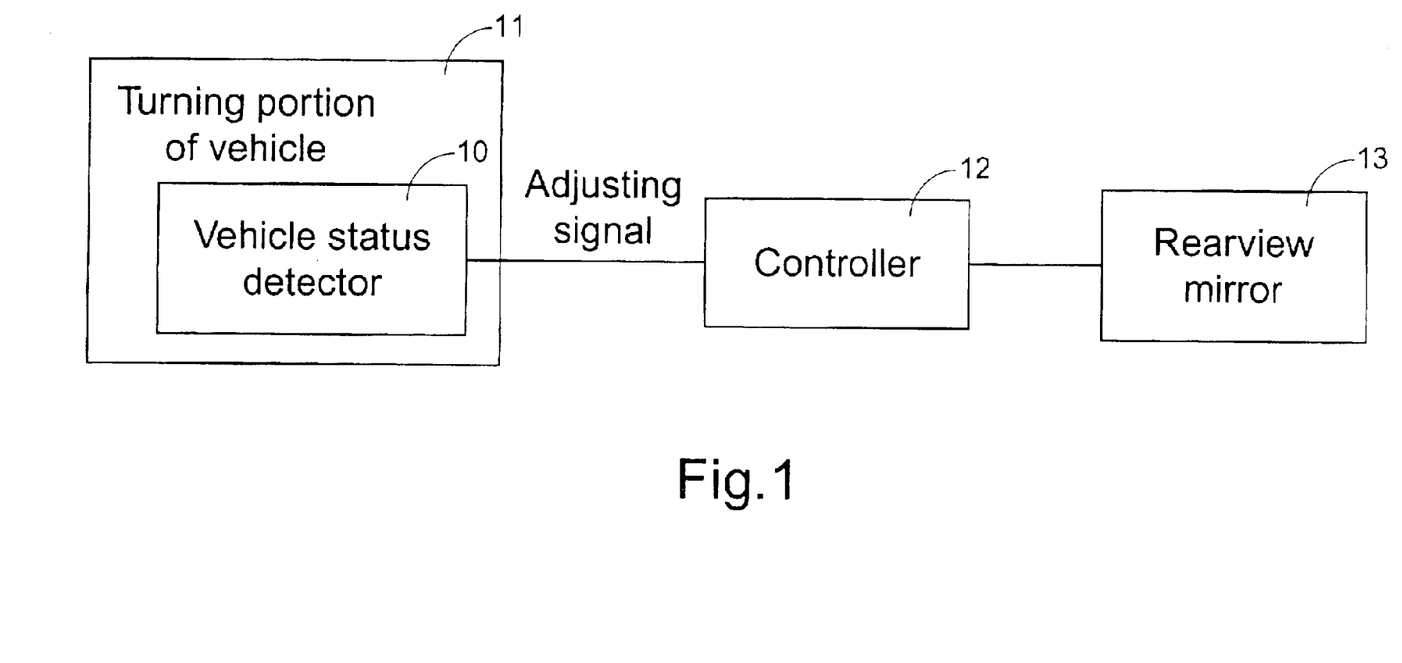
FIG. 1 is a schematic block diagram showing a device for dynamically adjusting the view range of the vehicular monitoring device according to a first embodiment of the present invention.

The vehicle status detector 10, for example, can be implemented by a variable resistor device or an optical chopper device. It is understood that in addition to the rearview mirror 13, the controller 12 can also move the vehicular camera such as a CCD or CMOS camera to view various ranges via a display such as a liquid crystal display, or any other vehicular monitoring device having an adjustable view range. Alternatively, the controller 12 changes the view ranges by focus-change of the camera or zooming operation of the display. Herein and hereinafter, the term "move", "moving", "moved" or "movement" broadly means the change of the vehicular monitoring device on location, orientation, focus, zooming effect, etc., due to for example shift, rotation, pivoting or the combination thereof, in order to obtain a suitable view range.

Figure 2:
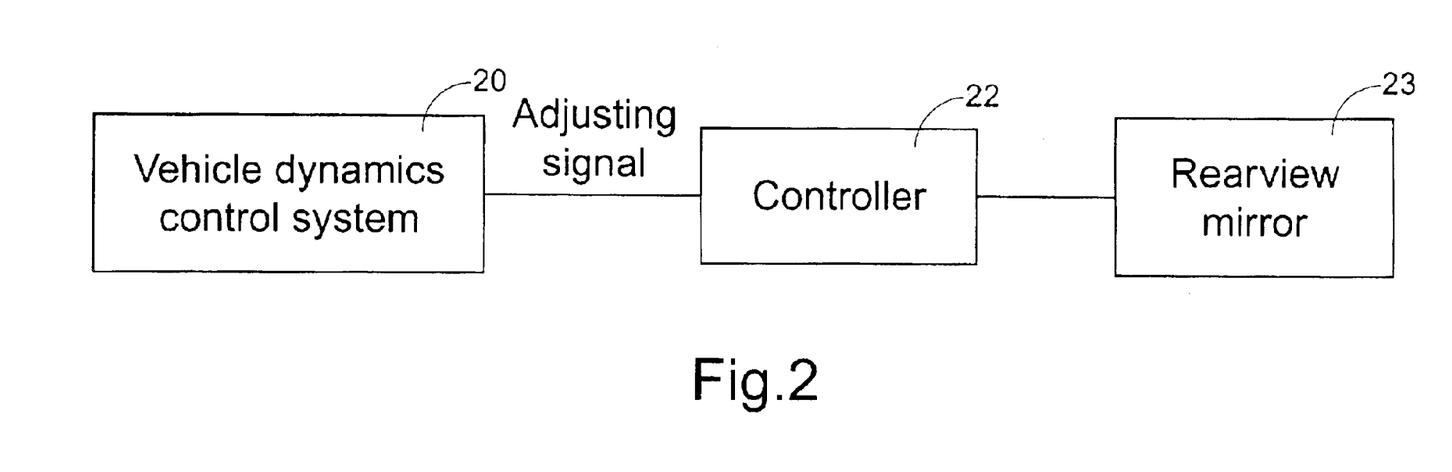
FIG. 2 is a schematic block diagram showing a device for dynamically adjusting the view range of the vehicular monitoring device according to a second embodiment of the present invention.

Please refer to FIG. 2 which schematically shows the device for dynamically adjusting the view range of the vehicular monitoring device, e.g. a rearview mirror, according to a second embodiment of the present invention. In this embodiment, the vehicle status detector is a vehicle dynamics control system 20 such as a vehicle stability control (VSC) system or an electronic stability program (ESP). The vehicle dynamics control system 20 detects the turning information of the vehicle, and outputs an adjusting signal associated with the turning information to the controller 22. The controller 22 then controls the movement of the rearview mirror 23 in response to the adjusting signal. For example, the output of a yaw sensor including in the vehicle dynamics control system 20 is referred to output the adjusting signal.

Figure 3:
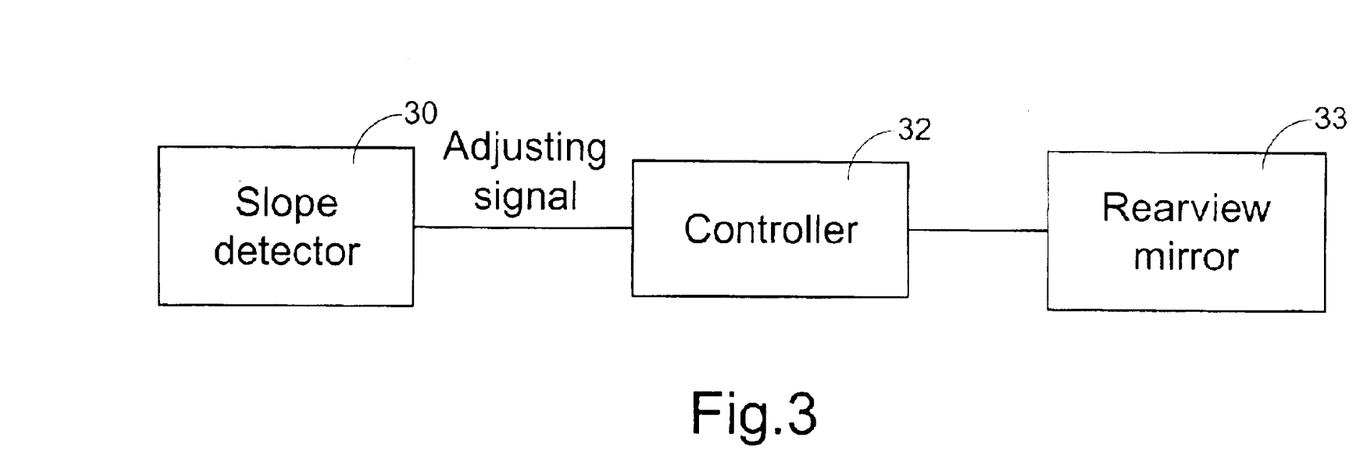
FIG. 3 is a schematic block diagram showing a device for dynamically adjusting the view range of the vehicular monitoring device according to a third embodiment of the present invention.

FIG. 3 schematically shows a third embodiment of the device for dynamically adjusting the view range of the vehicular monitoring device, e.g. a rearview mirror, according to the present invention. The vehicle status detector is a slope detector 30 such as an attitude indicator, an accelerating indicator or a mercury switch. For example, when the vehicle is climbing up a hill, the slope detector 30 detects the climbing slope of the vehicle, and outputs an adjusting signal to the controller 32 to have the rearview mirror 33 turned downwards, thereby providing a suitable view range.

Figure 4:
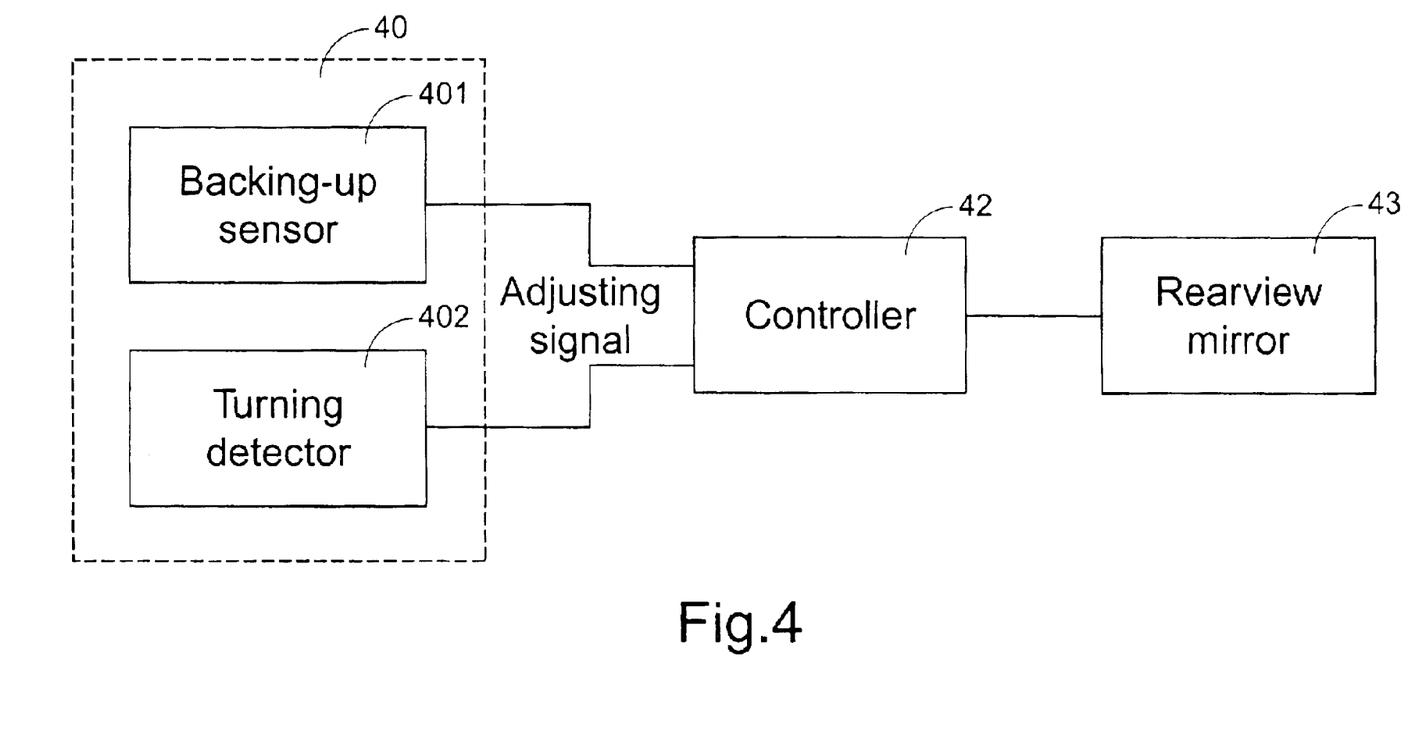
FIG. 4 is a schematic block diagram showing a device for dynamically adjusting the view range of the vehicular monitoring device according to a fourth embodiment of the present invention.

Please refer to FIG. 4 which illustrates a device for dynamically adjusting the view range of the vehicular monitoring device, e.g. a rearview mirror, according to a fourth embodiment of the present invention. The vehicle status detector 40 includes a backing-up sensor 401 and a turning detector 402. The backing-up sensor 401, for example, detects the entering of the reverse gear or the enabling of the back-warning radar. The turning detector 402 can be any detector capable of realizing the turning degree of the vehicle. For example, it can be an electronic compass, a steering-wheel turning detector, a tire-angle switch, a VSC system, a ESP, or a yaw sensor. The turning information of the vehicle is outputted to the controller 42 when the backing-up motion is determined. The controller 42 then controls the movement of the rearview mirror 43 in response to the adjusting signal indicative of the backing-up and turning-degree information.

Figure 5:
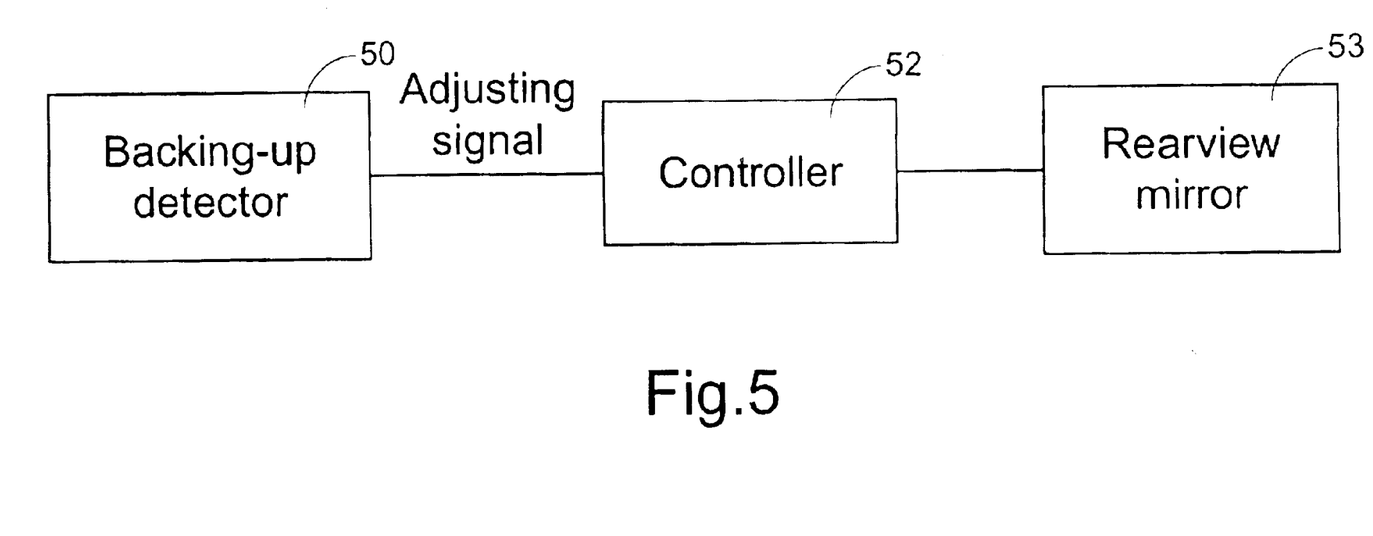
FIG. 5 is a schematic block diagram showing a device for dynamically adjusting the view range of the vehicular monitoring device according to a fifth embodiment of the present invention.

A fifth embodiment of the device for dynamically adjusting the view range of the vehicular monitoring device, e.g. a rearview mirror, according to the present invention is shown in FIG. 5. The vehicle status detector is a backing-up detector 50 such as a back-warning radar which can realize the clearance of the vehicle from another vehicle or blockade therebehind. The clearance information is outputted to the controller 52 when the backing-up motion is determined. The controller 52 then controls the movement of the rearview mirror 53 in response to the adjusting signal indicative of the backing-up and clearance information. In addition to the back-warning radar, the backing-up detector can also be a radio wave distance meter or a digital camera.

The above embodiments are illustrated by continuous change of the vehicular monitoring device with the change of the vehicular traveling status. Alternatively, the change of the vehicular monitoring device can be performed in stages. For example, the vehicular monitoring device is preset thereto an initial position and three different working positions for three kinds of view ranges. The three kinds of view ranges are selected automatically according to the turning or slope information. For both of the continuous and stage modes, the view range of the vehicular monitoring device can be flexibly adjusted as required.

During the movement of the vehicular monitoring device from the initial position to any of working positions, the vehicular monitoring device is preferably forced to return to the initial position if an emergency state occurs. For example, the emergency state is determined when emergency brake is done, when the Anti-lock brake system (ABS) or the traction control system is enabled, etc.

Figure 6:
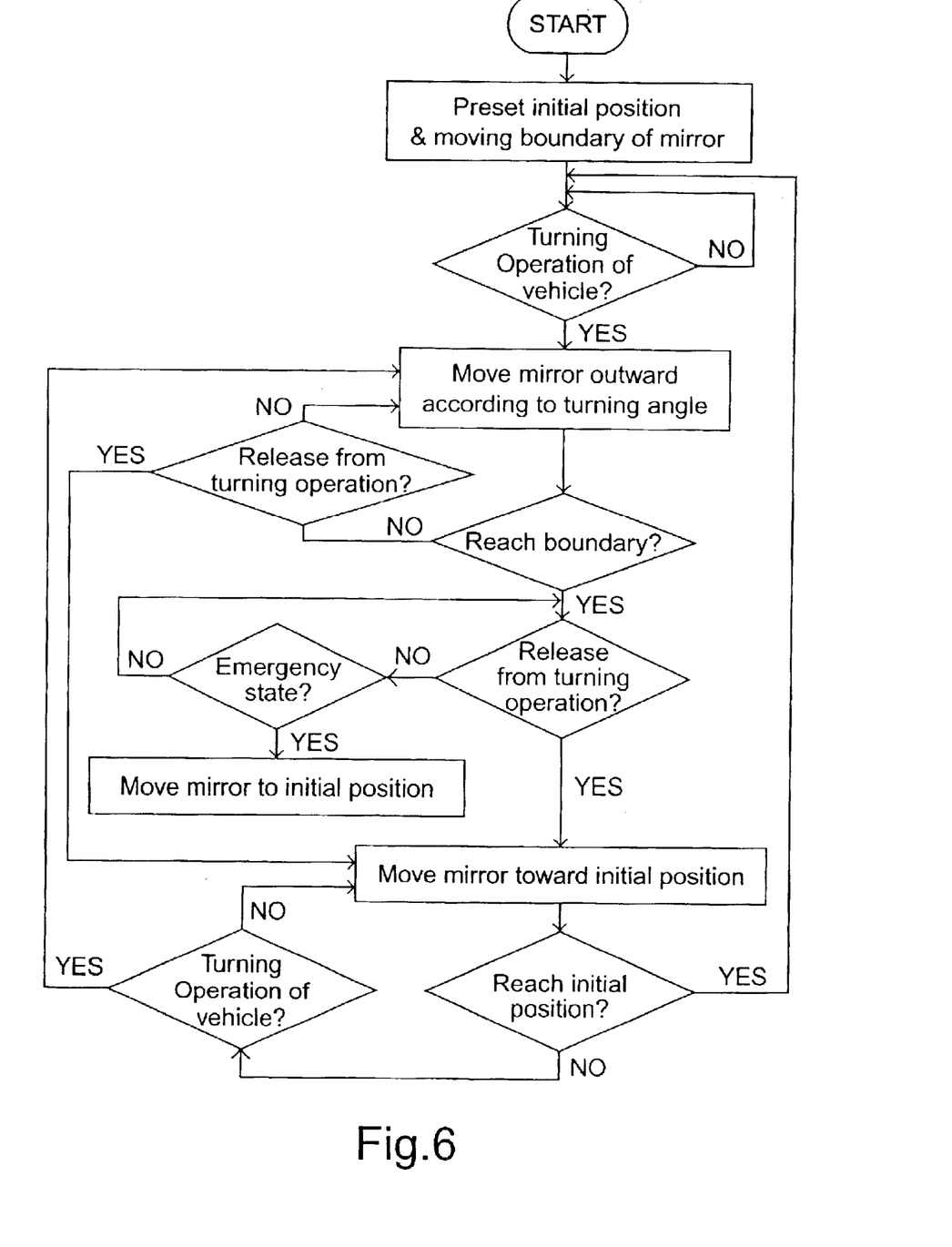
FIG. 6 is a schematic flowchart of a method for dynamically adjusting the view range of the vehicular monitoring device according to the present invention.

Please refer to the flowchart of FIG. 6. The flowchart of FIG. 6 is illustrated by using a rearview mirror as the vehicular monitoring device, and the view range of the rearview mirror is adjusted according to the turning degree of the vehicle. First of all, an initial position of the rearview mirror is preset by adjusting the rearview mirror before driving. While the driver is turning the vehicle right, the turning angle of the vehicle is detected, and the rearview mirror rotates outwards dynamically in response to the turning angle of the vehicle in order to enlarge the view range of the right side. The outward movement of the rearview mirror is preferably confined within a proper boundary. In other words, when the mirror reaches the moving boundary, the mirror will not rotate further even if the vehicle still turns. On the other hand, no matter if the mirror reaches the moving boundary or not, the mirror moves toward the initial position upon the vehicle returns to the forward direction. Likewise, during the trip of the mirror back to the initial position, no matter if the mirror reaches the initial position or not, the mirror is rotated outward again in response to the turning operation of the vehicle. However, when an emergency state occurs, the rearview mirror is forced to return to the initial position.

It is to be noted that the automatic view-angle adjusting function can be designed as a basic response of the vehicle. Alternatively, the function can be enabled by pressing a key or a button.

In another aspect of the present invention, preferably, the movement speed of the vehicular monitoring device between the initial position and any of the working positions depends on the velocity of the vehicle. The faster the vehicle runs, the faster the vehicular monitoring device moves. As such, the driver can realize the environment situation quickly. For efficiently achieving the above purpose, a vehicular digital bus such as a controller area network (CAN) or a vehicular area network (VAN) bus is preferred used to transfer signals.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A device for adjusting a view range of a vehicular monitoring device, comprising:

a vehicle status detector mounted on a turning portion of a vehicle for detecting a turning degree of said turning portion, and outputting an adjusting signal associated with said turning degree; and a controller in communication with said vehicle status detector and said vehicular monitoring device, controlling said vehicular monitoring device to move from an initial position to a working position in response to said adjusting signal, wherein said working position varies with said turning degree, and a movement speed of said vehicular monitoring device between said initial position and said working position depends on a velocity of the vehicle.

2. The device according to claim 1 wherein said turning portion is a steering wheel of the vehicle.

3. The device according to claim 1 wherein said turning portion is a driving tire of the vehicle.

4. The device according to claim 1 wherein said working position continuously varies with said turning degree.

5. The device according to claim 1 wherein said working position varies with said turning degree in stages.

6. The device according to claim 1 wherein said vehicular monitoring device is a rearview mirror.

7. The device according to claim 1 wherein said vehicular monitoring device is a camera.

8. The device according to claim 1 wherein said vehicular monitoring device is a display.

9. The device according to claim 1 further comprising a vehicular digital bus for communicating said vehicle status detector with said controller.

10. The device according to claim 9 wherein said vehicular digital bus is a controller area network (CAN) bus or a vehicle area network (VAN) bus.

11. A device for adjusting a view range of a vehicular monitoring device, comprising:

a vehicle dynamics control system detecting a plurality of traveling parameters of a vehicle; and a controller in communication with said vehicle dynamics automatic control system and said vehicular monitoring device, controlling said vehicular monitoring device to move from an initial position to a working position in response to a turning information included in said plurality of traveling parameters, wherein said working position varies with said turning information.

12. The device according to claim 11 wherein said vehicle dynamics automatic control system is a vehicle stability control (VSC) system.

13. The device according to claim 11 wherein said vehicle dynamics automatic control system is an electronic stability program (ESP).

14. The device according to claim 11 wherein said working position continuously varies with said turning information.

15. The device according to claim 11 wherein said working position varies with said turning information in stages.

16. A device for adjusting a view range of a vehicular monitoring device, comprising:

a slope detector for detecting a tilting degree of a vehicle, and outputting an adjusting signal associated with said slope information; and a controller in communication with said slope detector and said vehicular monitoring device, controlling said vehicular monitoring device to move from an initial position to a working position in response to said adjusting signal, wherein said working position varies with said tilting degree.

17. The device according to claim 16 wherein said slope detector is an attitude indicator.

18. The device according to claim 16 wherein said slope detector is an accelerating indicator.

19. The device according to claim 16 wherein said slope detector is a mercury switch.

20. The device according to claim 16 wherein said working position continuously varies with said tilting degree.

21. The device according to claim 16 wherein said working position varies with said tilting degree in stages.

22. A device for adjusting a view range of a vehicular monitoring device, comprising:

a backing-up sensor for determining whether a backing-up operation is to be performed, and detecting a clearance of a vehicle from a rear object when said backing-up operation is determined; and a controller in communication with said backing-up detector said vehicular monitoring device, controlling said vehicular monitoring device to move from an initial position working position according to said clearance, wherein said working position varies with said clearance.

23. The device according to claim 22 wherein said backing-up detector is a back-warning radar.

24. The device according to claim 22 wherein said backing-up detector is a digital camera.

25. The device according to claim 22 wherein said back-up detector is a radio wave distance meter.

26. The device according to claim 22 wherein said working position continuosly varies with said clearance.

27. The device according to claim 22 wherein said working position varies with said clearance in stages.

28. A method for adjusting a view range of a vehicular monitoring device, comprising:

receiving an output of a vehicular status detector;

triggering said vehicular monitoring device to move between an initial position and a working position according to said output of said vehicular status indicator; and forcibly moving said vehicular monitoring device back to said initial position when an emergency state is determined.

29. The method according to claim 28 wherein said vehicular status detector is selected from a group consisting of an electronic compass, a global positioning system (GPS), a steering-wheel turning detector, a tire-angle switch, a vehicle stability control (VSC) system, an electronic stability program (ESP), a yaw sensor, an attitude indicator, an accelerating indicator, a mercury switch, a reverse gear sensor and a back-warning radar.

30. The method according to claim 28 wherein said working position continuously varies with said output of said vehicular monitoring device.

31. The method according to claim 28 wherein said working position varies with said vehicular monitoring device in stages.

32. The method according to claim 28 wherein said emergency state is determined when emergency brake is done.

33. The method according to claim 28 wherein said emergency state is determined when the anti-lock brake system (ABS) is enabled.

34. The method according to claim 28 wherein said emergency state is determined when the traction control system is enabled.

* * * * *